(12) United States Patent
Doser

(10) Patent No.: US 9,219,898 B2
(45) Date of Patent: Dec. 22, 2015

(54) CONSTRAINED COLOR PALETTE IN A COLOR SPACE

(75) Inventor: Ingo Tobias Doser, Burbank, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1196 days.

(21) Appl. No.: 12/086,707

(22) PCT Filed: Dec. 7, 2006

(86) PCT No.: PCT/US2006/046705
§ 371 (c)(1),
(2), (4) Date: Jun. 18, 2008

(87) PCT Pub. No.: WO2007/078563
PCT Pub. Date: Jul. 12, 2007

(65) Prior Publication Data
US 2009/0284554 A1    Nov. 19, 2009

Related U.S. Application Data

(60) Provisional application No. 60/752,412, filed on Dec. 21, 2005.

(51) Int. Cl.
*G09G 5/02* (2006.01)
*H04N 9/67* (2006.01)
*G09G 5/06* (2006.01)
*H04N 1/60* (2006.01)

(52) U.S. Cl.
CPC .. *H04N 9/67* (2013.01); *G09G 5/02* (2013.01); *G09G 5/06* (2013.01); *H04N 1/6058* (2013.01)

(58) Field of Classification Search
USPC .................................................. 345/589–593
See application file for complete search history.

(56) References Cited

U.S. PATENT DOCUMENTS

| 4,663,663 A | 5/1987 | Lee |
| 4,670,780 A | 6/1987 | McManus et al. |
| 4,689,669 A | 8/1987 | Hoshino et al. |

(Continued)

FOREIGN PATENT DOCUMENTS

| DE | 10023270 | 5/2002 |
| EP | 0183539 | 6/1986 |

(Continued)

OTHER PUBLICATIONS

Takahashi et al.: "Method for Color Gamut Compression Based on Subjective Evaluation", Proceedings of the SPIE—The international Society for Optical Engineering, vol. 4662, pp. 455-464, Jan. 2002.

(Continued)

*Primary Examiner* — Ryan R Yang
(74) *Attorney, Agent, or Firm* — Robert D. Shedd; Lily Neff

(57) ABSTRACT

A technique for enabling display of a source color space on a display color space commences by first receiving source color space information. The source color space information undergoes a conversion into a device independent color space. Once converted into the device independent color space, a LUT or other matrix assigns output colors for the input colors corresponding to the specific display device color space. The LUT or other matrix can be generated with the source material and transmitted to the source display device.

20 Claims, 7 Drawing Sheets

(56) References Cited

U.S. PATENT DOCUMENTS

| | | | |
|---|---|---|---|
| 4,975,769 A | 12/1990 | Aizu et al. |
| 4,994,901 A | 2/1991 | Parulski et al. |
| 5,212,546 A | 5/1993 | Arazi et al. |
| 5,233,684 A | 8/1993 | Ulichney |
| 5,268,754 A | 12/1993 | Van de Capelle et al. |
| 5,311,295 A | 5/1994 | Tallman et al. |
| 5,333,069 A | 7/1994 | Spence |
| 5,377,041 A | 12/1994 | Spaulding et al. |
| 5,416,614 A | 5/1995 | Crawford |
| 5,416,890 A | 5/1995 | Beretta |
| 5,475,402 A | 12/1995 | Hijikata |
| 5,541,742 A | 7/1996 | Imao et al. |
| 5,568,596 A | 10/1996 | Cawley |
| 5,587,979 A | 12/1996 | Bluthgen |
| 5,668,890 A | 9/1997 | Winkelman |
| 5,731,818 A | 3/1998 | Wan et al. |
| 5,742,350 A | 4/1998 | Pan et al. |
| 5,754,184 A | 5/1998 | Ring et al. |
| 5,805,213 A | 9/1998 | Spaulding et al. |
| 5,832,109 A | 11/1998 | Mahy |
| 5,832,120 A | 11/1998 | Prabhakar et al. |
| 5,990,982 A | 11/1999 | Gove et al. |
| 6,044,172 A | 3/2000 | Allen |
| 6,075,573 A | 6/2000 | Shyu |
| 6,100,999 A | 8/2000 | Ikegami |
| 6,101,272 A | 8/2000 | Noguchi |
| 6,229,626 B1 | 5/2001 | Boll |
| 6,243,133 B1 | 6/2001 | Spaulding et al. |
| 6,268,939 B1 | 7/2001 | Klassen et al. |
| 6,282,312 B1 | 8/2001 | McCarthy et al. |
| 6,340,975 B2 * | 1/2002 | Marsden et al. ............. 345/590 |
| 6,351,320 B1 | 2/2002 | Shin |
| 6,360,007 B1 | 3/2002 | Robinson et al. |
| 6,388,648 B1 | 5/2002 | Clifton et al. |
| 6,421,094 B1 | 7/2002 | Han |
| 6,421,142 B1 | 7/2002 | Lin et al. |
| 6,445,816 B1 | 9/2002 | Pettigrew |
| 6,445,874 B1 | 9/2002 | Catlow |
| 6,516,089 B1 | 2/2003 | McCann et al. |
| 6,560,358 B1 | 5/2003 | Tsukada |
| 6,563,946 B2 | 5/2003 | Kato |
| 6,591,009 B1 | 7/2003 | Usami et al. |
| 6,603,483 B1 | 8/2003 | Newman |
| 6,621,604 B2 | 9/2003 | DeLean |
| 6,707,938 B2 | 3/2004 | de Queiroz et al. |
| 6,754,384 B1 | 6/2004 | Spaulding et al. |
| 6,771,323 B1 | 8/2004 | Dean et al. |
| 6,775,407 B1 | 8/2004 | Gindele et al. |
| 6,822,760 B1 | 11/2004 | Spaulding et al. |
| 6,826,303 B2 | 11/2004 | D'Souza et al. |
| 6,873,439 B2 | 3/2005 | Levy et al. |
| 6,885,381 B1 | 4/2005 | Ford et al. |
| 6,897,876 B2 | 5/2005 | Murdoch et al. |
| 6,947,589 B2 | 9/2005 | Newman et al. |
| 6,977,661 B1 | 12/2005 | Stokes et al. |
| 6,979,069 B2 | 12/2005 | Tamagawa |
| 6,999,617 B1 | 2/2006 | Ohga |
| 7,057,765 B1 | 6/2006 | Fischer et al. |
| 7,184,057 B2 | 2/2007 | Stokes et al. |
| 7,345,787 B2 | 3/2008 | Ito et al. |
| 7,403,304 B2 | 7/2008 | Andreas et al. |
| 7,515,161 B1 * | 4/2009 | Morgan ........................ 345/691 |
| 8,149,338 B2 | 4/2012 | Rehm |
| 2001/0008428 A1 | 7/2001 | Oh |
| 2001/0017627 A1 * | 8/2001 | Marsden et al. ............. 345/501 |
| 2001/0033286 A1 | 10/2001 | Stokes et al. |
| 2002/0027603 A1 | 3/2002 | Kuwata et al. |
| 2002/0118211 A1 * | 8/2002 | Figueroa et al. ............. 345/603 |
| 2002/0118380 A1 | 8/2002 | Krueger et al. |
| 2002/0120781 A1 | 8/2002 | Hirashima et al. |
| 2002/0122044 A1 | 9/2002 | Deering |
| 2002/0122194 A1 | 9/2002 | Kuwata et al. |
| 2002/0130957 A1 | 9/2002 | Gallagher et al. |
| 2002/0140952 A1 | 10/2002 | Fukasawa |
| 2002/0163657 A1 | 11/2002 | Bogdanowicz et al. |
| 2002/0163676 A1 | 11/2002 | Jones et al. |
| 2002/0180892 A1 | 12/2002 | Cacciatore et al. |
| 2003/0012427 A1 | 1/2003 | Martinez-Uriegas et al. |
| 2003/0012432 A1 | 1/2003 | D'Souza et al. |
| 2003/0030754 A1 | 2/2003 | Tsukada |
| 2003/0052904 A1 | 3/2003 | Gu |
| 2003/0053683 A1 | 3/2003 | Newman et al. |
| 2003/0081828 A1 | 5/2003 | Curry |
| 2003/0117413 A1 | 6/2003 | Matsuda |
| 2003/0122842 A1 | 7/2003 | Newman |
| 2003/0160801 A1 | 8/2003 | Butler |
| 2003/0174885 A1 | 9/2003 | Levy et al. |
| 2003/0193598 A1 | 10/2003 | Takemura |
| 2003/0208638 A1 | 11/2003 | Abrams, Jr. et al. |
| 2004/0021672 A1 | 2/2004 | Wada |
| 2004/0041920 A1 | 3/2004 | Mizukami et al. |
| 2004/0061740 A1 | 4/2004 | Tamagawa |
| 2004/0100643 A1 | 5/2004 | Jones et al. |
| 2004/0105581 A1 | 6/2004 | Sawada |
| 2004/0113864 A1 | 6/2004 | Nonaka |
| 2004/0129149 A1 | 7/2004 | Ross |
| 2004/0131249 A1 | 7/2004 | Sandrew |
| 2004/0145590 A1 | 7/2004 | Yu et al. |
| 2004/0170330 A1 | 9/2004 | Fogg |
| 2004/0196250 A1 | 10/2004 | Mehrotra et al. |
| 2004/0263528 A1 | 12/2004 | Murdoch et al. |
| 2004/0263882 A1 | 12/2004 | Ito et al. |
| 2005/0021258 A1 | 1/2005 | Fasciano |
| 2005/0073730 A1 | 4/2005 | Huang et al. |
| 2005/0134801 A1 * | 6/2005 | Bogdanowicz et al. ........ 352/38 |
| 2005/0141008 A1 | 6/2005 | Billow et al. |
| 2005/0141848 A1 | 6/2005 | Deguchi et al. |
| 2005/0147295 A1 | 7/2005 | Kim et al. |
| 2005/0152597 A1 | 7/2005 | Spaulding et al. |
| 2005/0152612 A1 * | 7/2005 | Spaulding et al. ............. 382/254 |
| 2005/0248785 A1 * | 11/2005 | Henley et al. .................. 358/1.9 |
| 2005/0270382 A1 | 12/2005 | Kurumisawa |
| 2006/0018536 A1 | 1/2006 | Haikin et al. |
| 2006/0096483 A1 | 5/2006 | Andreas et al. |
| 2006/0103861 A1 | 5/2006 | Klassen et al. |
| 2006/0244983 A1 | 11/2006 | Zeng |
| 2007/0046958 A1 | 3/2007 | Hoof et al. |
| 2007/0078563 A1 | 4/2007 | Harris et al. |
| 2007/0121132 A1 | 5/2007 | Blinn et al. |
| 2007/0211074 A1 | 9/2007 | Yeung |
| 2007/0223813 A1 | 9/2007 | Segall et al. |
| 2007/0268411 A1 | 11/2007 | Rehm et al. |
| 2007/0291179 A1 | 12/2007 | Sterling et al. |
| 2008/0195977 A1 | 8/2008 | Carroll et al. |
| 2009/0080769 A1 | 3/2009 | Kagawa et al. |
| 2009/0102968 A1 | 4/2009 | Doser et al. |
| 2009/0109344 A1 | 4/2009 | Ollivier et al. |
| 2009/0174726 A1 | 7/2009 | Ollivier |
| 2009/0201309 A1 | 8/2009 | Demos |
| 2009/0238456 A1 | 9/2009 | Fukasawa |
| 2009/0285328 A1 | 11/2009 | Sekimoto |
| 2010/0035419 A1 | 2/2010 | Dube et al. |
| 2010/0128976 A1 | 5/2010 | Stauder et al. |
| 2010/0134529 A1 | 6/2010 | Doser et al. |
| 2010/0157154 A1 | 6/2010 | Kobayashi et al. |
| 2010/0220237 A1 | 9/2010 | Doser et al. |
| 2010/0245380 A1 | 9/2010 | Doser et al. |
| 2010/0265264 A1 | 10/2010 | Doser et al. |
| 2010/0289810 A1 | 11/2010 | Doser et al. |
| 2011/0154426 A1 | 6/2011 | Doser et al. |

FOREIGN PATENT DOCUMENTS

| | | |
|---|---|---|
| EP | 0203448 | 12/1986 |
| EP | 0508626 | 10/1992 |
| EP | 0526989 A2 | 2/1993 |
| EP | 0546773 | 6/1993 |
| EP | 0556133 A2 | 8/1993 |
| EP | 0579224 | 1/1994 |
| EP | 0679020 | 10/1995 |
| EP | 0739139 | 10/1996 |
| EP | 0867880 A2 | 9/1998 |
| EP | 0948194 A2 | 10/1999 |
| EP | 0974934 A2 | 1/2000 |

(56) References Cited

FOREIGN PATENT DOCUMENTS

| | | |
|---|---|---|
| EP | 0993180 A1 | 4/2000 |
| EP | 1049324 | 11/2000 |
| EP | 1102478 A2 | 5/2001 |
| EP | 1170576 A1 | 1/2002 |
| EP | 1237379 A2 | 9/2002 |
| EP | 1239668 A1 | 9/2002 |
| EP | 1578140 | 9/2005 |
| EP | 1845704 A2 | 10/2007 |
| JP | 63116277 | 5/1988 |
| JP | 0522658 | 1/1993 |
| JP | 5022658 | 1/1993 |
| JP | 5073020 | 3/1993 |
| JP | 06261207 | 9/1994 |
| JP | 07135635 | 5/1995 |
| JP | 07236069 | 9/1995 |
| JP | 07250346 | 9/1995 |
| JP | 08129370 | 5/1996 |
| JP | 08228295 | 9/1996 |
| JP | 1188672 | 3/1999 |
| JP | 11331622 | 11/1999 |
| JP | 2000115564 | 4/2000 |
| JP | 2000132155 | 5/2000 |
| JP | 2000152279 | 5/2000 |
| JP | 2000350050 A | 12/2000 |
| JP | 2001002261 | 1/2001 |
| JP | 2001148794 | 5/2001 |
| JP | 2002027275 | 1/2002 |
| JP | 2002033936 | 1/2002 |
| JP | 2002118767 | 4/2002 |
| JP | 2002152544 | 5/2002 |
| JP | 2002163668 | 6/2002 |
| JP | 2002218262 | 8/2002 |
| JP | 2002262120 | 9/2002 |
| JP | 2002281518 | 9/2002 |
| JP | 2002314831 | 10/2002 |
| JP | 2003087586 | 3/2003 |
| JP | 2003125227 | 4/2003 |
| JP | 2003143425 A | 5/2003 |
| JP | 2003153297 | 5/2003 |
| JP | 2003169220 | 6/2003 |
| JP | 2003241732 | 8/2003 |
| JP | 2004032700 | 1/2004 |
| JP | 2004096506 | 3/2004 |
| JP | 2004110647 | 4/2004 |
| JP | 2004112169 | 4/2004 |
| JP | 2004129149 | 4/2004 |
| JP | 2004228734 | 8/2004 |
| JP | 2004240606 | 8/2004 |
| JP | 2004242066 | 8/2004 |
| JP | 2004282599 | 10/2004 |
| JP | 2004320626 | 11/2004 |
| JP | 2005012285 | 1/2005 |
| JP | 2005265927 | 9/2005 |
| JP | 2005287069 | 10/2005 |
| JP | 2005318491 | 11/2005 |
| JP | 2005348355 A | 12/2005 |
| KR | 20010002261 | 1/2001 |
| KR | 100800736 | 2/2008 |
| WO | WO8606906 | 11/1986 |
| WO | WO9209963 | 6/1992 |
| WO | WO0074372 | 12/2000 |
| WO | 0178368 A2 | 10/2001 |
| WO | WO0178004 | 10/2001 |
| WO | WO2006039357 A1 | 4/2006 |
| WO | WO2006050305 A1 | 5/2006 |
| WO | WO2008085150 | 7/2008 |

OTHER PUBLICATIONS

Campadelli et al.: "A System for the Automatic Selection of Conspicuous Color Sets for Qualitative Data Display", IEEE Transactions on Geoscience Remote Sensing, vol. 39, No. 10, pp. 2283-2286, Oct. 2001.

Internet Citation: "High-Definition Multimedia Interface Specification Version 1.3", Jun. 22, 2006, XP002391813.

Koh et al.: "Issues Encountered in Creating a Version 4 ICC sRGB Profile", Final program and proceedings of IS&T and SID Eleventh Color Imaging Conference: Color Science and Engineering, pp. 232-237, Soc. for Imaging Science and Technol.,Sprinfield, VA, 2003, xviii + 372 pages.

Mahy: "Gamut Calculation of Color Reproduction Devices", Final Program of IS&T/SID Fourth Color Imaging Conference: Color Science, Systems & Appllications, pp. 145-150, Soc. Imaging Science & Technol., Springfield, VA, 1996, xvi + 248 pages.

Saito et al.: "3D Gamut Mapping by Comparison Between Image and Device Gamut Description", Proceedings of ICIS'02, Tokyo, International Congress of Imaging Science 2002, Soc. Photographic Science & Technol., pp. 407-408, Tokyo, Japan, 2002, xxxxx + 718 pages.

Schmitz et al.: "Color Palette Restoration", Graphical Models and Image Processing, vol. 57, No. 5, pp. 409-419, Sep. 1995.

International Search Report, dated Oct. 30, 2007.

White Paper, "Windows Color System: The Next Generation Color Management System", Microsoft Windows, Sep. 2005.

Bourgoin, "Windows Color System: Evolution in the Microsoft Color Management Ecosystem", Windows Digital Document Platforms & Solutions Group, Microsoft Corporation, 2005.

Specification ICC. 1:2004-10, Image Techndogy Colour Management-Architecture, Profile Format, and Data Structure, International Color Consortium, May 22, 2006.

Oh, et al., "A Systolic Pipelined NTSC/PAL Digital Video Encoder", IEICE Trans Fundamentals, vol. E81-A, No. 6, Jun. 1998.

Office Actions for U.S. Appl. No. 12/083,026 mailed Jun. 2, 2011; Oct. 31, 2011; Sep. 13, 2013 and Apr. 10, 2014.

Office Actions for U.S. Appl. No. 10/593,195 mailed Oct. 20, 2009; Jan. 28, 2010; Jul. 9, 2010; Notice of Allowance mailed Dec. 1, 2010; and Notice of Abandonment mailed Mar. 17, 2011.

Office Actions for U.S. Appl. No. 12/224,538 mailed Jun. 7, 2011; Nov. 22, 2011; Jun. 29, 2012; Sep. 14, 2012; Apr. 19, 2013; Notice of Allowance mailed Nov. 29, 2013; Withdrawal of Notice of Allowance mailed Mar. 3, 2014; Notices of Allowance mailed Mar. 20, 2014 and Sep. 26, 2014; Office Action issued Feb. 6, 2015.

Office Action for U.S. Appl. No. 12/450,622 mailed Feb. 20, 2013; Notice of Allowance mailed Aug. 28, 2013; Office Action issued Dec. 30, 2013; Notice of Allowance mailed Aug. 18, 2014.

Office Actions for U.S. Appl. No. 12/450,637 mailed Mar. 20, 2012 and Oct. 15, 2012; Examiner's Answer to Appeal Brief mailed Sep. 27, 2013.

Office Actions for U.S. Appl. No. 12/450,621 mailed Feb. 27, 2013 and Dec. 13, 2013; Notices of Allowance mailed Aug. 30, 2013 and Jun. 20, 2014.

Office Actions for U.S. Appl. No. 11/665,809 mailed Dec. 7, 2009; Feb. 26, 2010; Nov. 8, 2010; Mar. 15, 2011; Oct. 5, 2011; Nov. 7, 2011; Notices of Allowance mailed Apr. 20, 2011; Aug. 4, 2011; Nov. 18, 2011; Jun. 4, 2012; Oct. 28, 2014; Feb. 2, 2015.

Office Actions for U.S. Appl. No. 12/227,672 mailed Apr. 19, 2012 and Notices of Allowance mailed Novemeber 19, 2012; May 30, 2013; Dec. 6, 2013; Jun. 4, 2014.

Office Actions for U.S. Appl. No. 12/452,130 mailed Mar. 8, 2012; Sep. 20, 2012; Sep. 12, 2013 and Apr. 30, 2014.

Office Actions for U.S. Appl. No. 12/452,361 mailed Jan. 11, 2012; Jul. 23, 2012; Notice of Abandonment mailed Mar. 5, 2013.

Specification ICC 1:2004-10 Image Technology Colour Management—Artchitecture, profile format and data structure, May 22, 2006.

Morovic, et al., "The Fundamentals of Gamut Mapping: A Survey", Journal of Imaging Science & Technology, vol. 45, No. 3, May/Jun. 2001.

Feng Wu, et al., "A Framework for Efficient Progressive Fine Granularity Scalable Video Coding", IEE Transactions and Circuits and Systems for Video Technology, vol. 11, No. 3, pp. 332-344, Mar. 2001.

Ebner, et al., "Gamut Mapping from Below: Finding Minimum Perceptual Distances for Colors Outside the Gamut Volume" pp. 402-413, Jan. 1997.

Tremeau, et al. "Color Imaging Management in Film Processing", pp. 24-36.

(56) References Cited

OTHER PUBLICATIONS

Spaulding, et al., Using a Residual Image to Extend the Color Gamut and Dynamic Range of an sRGB Image, 2003 PICS Conference, pp. 307-314.

Spaulding, et al. "Optimized Extended Gamut Color Encoding for Scene-Referred and Output-Referred Image States", Journal of Imaging Science & Technology, vol. 45, No. 5, Sep./Oct. 2001, pp. 418-426.

James J. Gibson, on Constant Luminance, Gamma Correction, and Digitization of Color Space, IEEE 1995, pp. 178-179.

Michael Tinker, "Film Versus Digital Cinema: The Evolution of Moving Images", SPIE, vol. 5022, pp. 14-23, 2003.

Bruns, et al., "MPEG + Compression of Moving Pictures for Digital Cinema Using the MPEG-2 Toolkit", SMPTE Journal 2001.

Wallace, et al. "Color Gamut Matching for Tiled Display Walls", 2003.

Meier, R., "A Color Model for Digital Photo Printing on Silver Halide Paper" pp. 442-447, 2002.

IEC 61966-2-4, "Multimedia Systems and Equipment—Colour Measurement and Management: Part 2-4: Colour Management Extended-Gamut YCC Colour Space for Video Applications xvYCC", International Electrotechnical Commission, Jan. 2006.

Spaulding et al., "Extending the Color Gamut and Dynamic Range of an SRGB Image Using a Residual Image", vol. 28, No. 4, pp. 251-266, Aug. 2003.

\* cited by examiner

US 9,219,898 B2

CONSTRAINED COLOR PALETTE IN A COLOR SPACE

CROSS-REFERENCE TO RELATED APPLICATIONS

This application claims the benefit, under 35 U.S.C. §365 of International Application PCT/US2006/046705, filed Dec. 7, 2006 which was published in accordance with PCT Article 21(2) on Jul. 12, 2007, in English and which claims the benefit of U.S. provisional patent application No. 60/752,412, filed on Dec. 21, 2005, in English.

TECHNICAL FIELD

The present invention relates to color displays. More particularly, the invention relates to a technique for enabling display of a color space on a display.

BACKGROUND ART

The term color space generally refers to a model, generally numerical in nature that describes colors in a particular environment, such as the colors capable of display by a particular device. There are color spaces that are based on real world tri-stimulus displays and there are color spaces that are designed based on the CIE Color Matching functions or other encoding rules in order to cover all perceptible colors rather than all displayable colors. However, if the latter color spaces are used, then a display must have a recipe to deal with all legal colors of the color space which is a far too complicated task for a consumer type of display. The solution is to put constraints on the unconstrained color spaces in order to allow for a realizable conversion of the transmitted colors to the display gamut.

The DCI (Digital Cinema Initiative) deliberately does not limit the color palette, nor does the DCI propose a particular gamut conversion method in order to allow for new kinds of footage and for new kinds of display devices (e.g., projectors). To understand the problem, consider the following situation depicted in FIG. 1. A camera 101 records a real life scene with its sensor that has three types of sensors, red, green and blue, generating CIE 1932 tristimulus values $X_r, Y_r, Z_r$ for Red, $X_g, Y_g, Z_g$ for Green, and $X_b, Y_b, Z_b$ for Blue, respectively. Alternatively, the camera 101 could use also a different number of sensor types and the sensor sensitivities need not be described with "Red", "Green", "Blue", but by "Blue-Cyan" and "Yellow" or the like, but the first definition encompasses the most common situation. In a second step, the signals from the sensors within the camera are converted to the XYZ color space or another color space which is greater than the color gamut of the camera 101. In a third step, this data is transmitted to a sink (display) device 102 using this XYZ color space. The sink device 102, in this example comprises consumer type display, and uses a gamut conversion method to convert from XYZ or another color gamut to its own color gamut.

A problem can arise when the sink device (or display device) 102 has have a color gamut (space) which is smaller, and indeed significantly smaller, than the color gamut which is described by another color space, like the XYZ color space, or the xvYCC color space. Thus, the display device will need a mechanism for finding a display color for each individual color that is possible within the color gamut (color space) specific to the display device. The need to display each color in a different color space can give rise to additional problems. First, many algorithms use the source/sink gamut differences to determine the gamut conversion methodologies (e.g., soft clipping etc.). In the case of color spaces like XYZ and xvYCC as defined in IEC 61966-2-3, a very large color gamut must to be covered, and only a fraction of the possible input colors are actually used with real sources.

SUMMARY

According to one aspect of the present principles, a method for displaying a color image commences by converting received color information from a source color space into color information for a device independent color space. Thereafter processing the color information for the device independent color space occurs in accordance with the received color information. The processed color information undergoes a conversion from the device independent color space into color information for a device dependent color space for subsequent display.

According to a further aspect of the present principles, a method for displaying a color image commences by converting received color information from a source color space into color information for a device independent color space. The color information for the device independent color space undergoes processing in accordance with the received color information. Pre-loading color space data then occurs. Thereafter, the processed color information undergoes conversion from the device independent color space into color information for a device dependent color space for subsequent display using the pre-loaded color space data.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

In accordance with an illustrative embodiment of the present principles, a recording Device and/or Storage Device delivers an actual source gamut for a desired color space. This information is preserved by means of metadata all the way to a sink (display device, such as the display device 102 of FIG. 1. Any color manipulation done by means of any processing device in the signal chain will update the color gamut information accordingly.

Figure 2:
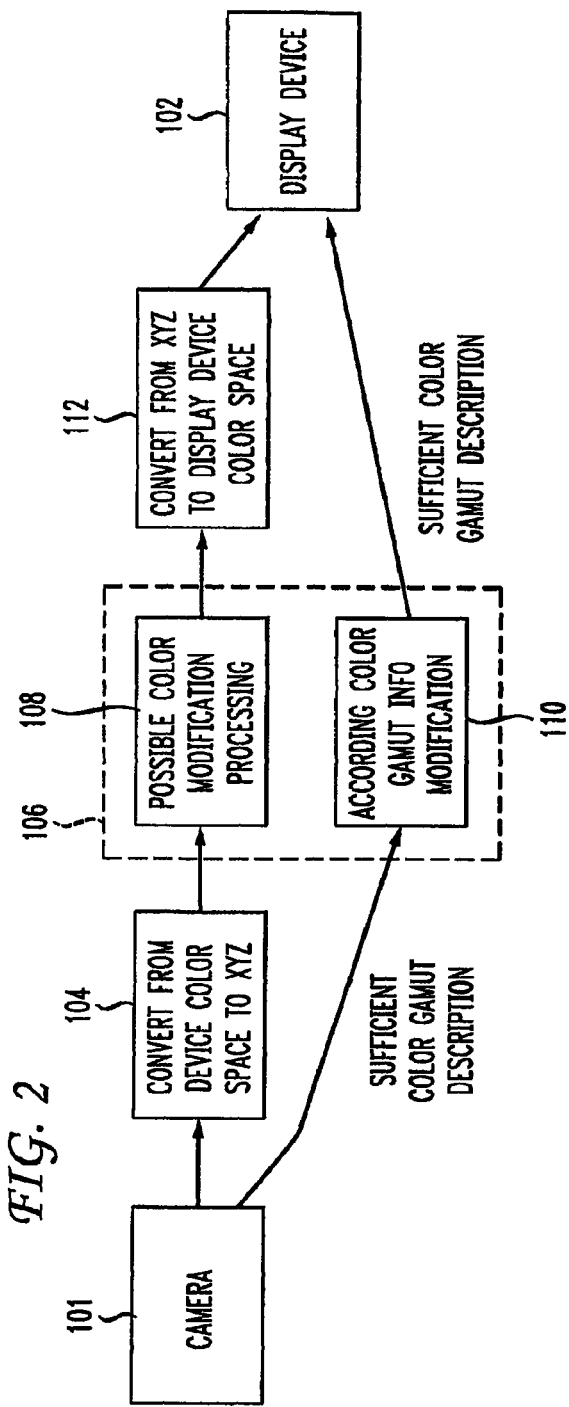
FIG. 2 depicts a signal path between a image capture device and a display device using additional metadata to describe the colors used in accordance with the present principles.

FIG. 2 depicts a signal flow with additional metadata describing actually used colors, in accordance with an exemplary implementation of the present principles. The color signal from the camera 101 is converted (104) from the camera's color space to another color space (e.g., the XYZ color space). The XYZ color space signal passes to a color manipulation stage 106 where block 108 can perform color modification processing. Such color modification processing can include the generation of the metadata that enables the delivery of the actual source gamut to the display color space.

The color signal undergoes conversion by block 112 from the XYZ color space to the display device color space for transmission to the display device 102. Those of skill in the art will recognize that the "XYZ" color space is used herein as an example only, and the color space can be any known or suitable color space, such as, for example, CIELAB, xvYCC, etc.

When the output from camera 101 has sufficient color gamut description, the description will get accorded color gamut modification information (i.e., metadata) 110 for transmission to the display device 102. "Sufficient Color Gamut Description" comprises the tristimulus coordinates of the primaries used for example. A Color Cube description of this type constitutes a preferable solution for according the color gamut information modification to the video signal. Other possibilities include the description of a color octahedron or any other 3-Dimensional geometric shape. Thus, in the example shown, the source color gamut description undergoes transmission from the source (e.g., camera 101) in the form of a color cube description.

The exchange format must be standardized in order to allow processing blocks further along the signal path to make sure that the display device can understand, interpret and ultimately display the proper color gamut. The color gamut description can under modification by any downstream color processing block (e.g., block 110) to follow the changes made to the data.

Figure 1:
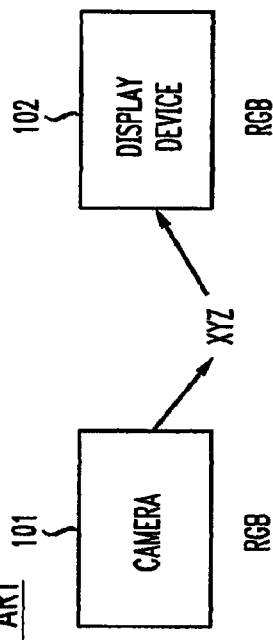
FIG. 1 depicts a signal path between a image capture device and a display device in accordance with the prior art.

In accordance with one aspect of the present principles, there is proposed a standard for Gamut Metadata for a display device, such as shown in FIGS. 1 and 2. The proposed standard for Device Gamut metadata is:

| Color | X | Y | Z |
|---|---|---|---|
| Color 1 (e.g. Red) | 0 <= X <= 1 | 0 <= Y <= 1 | 0 <= Z <= 1 |
| Color 2 (e.g. Green) | 0 <= X <= 1 | 0 <= Y <= 1 | 0 <= Z <= 1 |

-continued

| Color | X | Y | Z |
|---|---|---|---|
| Color 3 (e.g. Blue) | 0 <= X <= 1 | 0 <= Y <= 1 | 0 <= Z <= 1 |
| Color 4 (e.g. White) | 0 <= X <= 1 | 0 <= Y <= 1 | 0 <= Z <= 1 |
| Color 5 (e.g. Black) | 0 <= X <= 1 | 0 <= Y <= 1 | 0 <= Z <= 1 |
| Color 6 (e.g. Cyan) | 0 <= X <= 1 | 0 <= Y <= 1 | 0 <= Z <= 1 |
| Color 7 (e.g. Magenta) | 0 <= X <= 1 | 0 <= Y <= 1 | 0 <= Z <= 1 |
| Color 8 (e.g. Yellow) | 0 <= X <= 1 | 0 <= Y <= 1 | 0 <= Z <= 1 |

The rule is: The fewer colors that are necessary for describing the color gamut, the better. The present principles provides standardized metadata for transmitting device gamut and standardized metadata for transmitting Color Tables, hereinafter referred to as CLUTs, in that framework. Those of skill in the art will recognize that the present principles may also apply to gamut conversion necessary for purposes other than display, such as graphics insertion, editing, etc.

This metadata approach enables the display device 102 the ability to convert the source color space used to another color space (e.g., XYZ, xxYCC, etc.) which makes better use of the code. In other words, each color described by a codeword in the new color space is actually addressed by the source device. This allows the color LUT or any other implementation that enables the display of the source gamut on the target gamut to be much smaller and simpler.

This concept is valid if the Color Gamut description is in the form of a color cube, which means no non linear transformation of the color gamut, in which case, the same conversion methodologies of the original color space can be used. As shown in FIG. 2, the illustrated signal path significantly reduces the color conversions required and enables more efficient processing of the video stream from source to display.

Optional information for the "Sufficient Color Gamut Description" comprises the additional information that describes the code population of subspaces inside the three dimensional source color gamut. Such information can describe the necessity of processing some areas with a different accuracy than the others. One example of such information would be the Opto-Electrical Transfer Function used by the Source or any other device in the signal chain. This would provide hints to the processing quantization required on the back end, at the display. The display device 102 could then, for instance, use the gamut description to calculate the new color space and to calculate the corresponding Color Look Up Table (CLUT)—See FIG. 2.

In accordance with one embodiment of the present principles, the proposed standard for the CLUT's metadata is as follows:

Type: e.g. 3-Dimensional, e.g., cube, octahedron or any other geometric shape.

Number of output primaries

Intervals: e.g.; 10, 20 (intervals between input/output samples)

Number of samples: integer number

Data in M×N matrix format, M=Number of Samples, N=Number of output primaries.

When using a 3-D LUT, regular cube spacing is assumed so that input colors do not have to be stored.

In an alternative embodiment, the display device 102 could have a set of color spaces and corresponding CLUT's. The display device could then select a color space and CLUT depending on the input color gamut. However, the display device must select a color gamut of the selected color space that fully encloses the color gamut of the source. Alternatively, the gamut description should include accompanying data describing a CLUT for the conversion.

Figure 3:
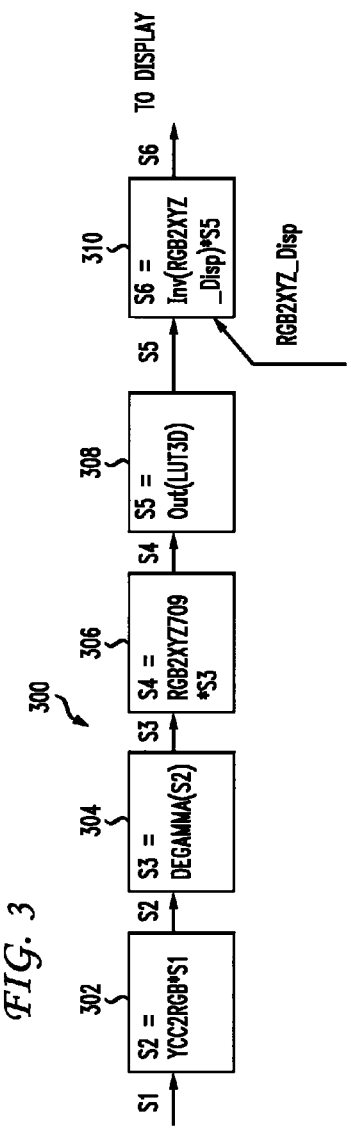
FIG. 3 depicts a block schematic diagram of an apparatus in accordance with one aspect of the present principles for deriving display data from an xvYCC color space or other color space without source gamut metadata.

FIG. 3 illustrates an apparatus 300 for deriving display data from an xvYCC color space without source gamut. Apparatus 300 can comprise a receiver or other type of device that provides a video signal to the display. The additional metadata information can serve to change the source color space into a new color space (e.g., device independent color space) that has better code efficiency. As mentioned above, this new color space can then be used for an efficient conversion to the target color space using a CLUT, and in most cases, with a 3D-LUT.

The input source S1 signal is a YCbCr signal as defined in the ITU recommendation ITU-R BT.709, ITU-R BT.601 or IEC 61966-2-3 (xvYCC). For purposes of this discussion, it is assumed that the S1 signal is normalized so that the nominal white point is achieved for Y=1, Cb=0 and Cr=0. Furthermore, it is assumed that any given subsampling is removed prior to processing.

The input source S1 signal is fed to block 302 for color space conversion from a component signal to a RGB signal. In this respect, a conversion matrix YCC2RGB is applied to S1 to generate signal S2. In accordance with one aspect, YCC2RGB is e selected according to the video standard used, either derived from the color space conversion as defined for High Definition ITU-R BT.709 (Part 2) or derived by the color space conversion as defined in ITU-R BT.601. However, YCC2RGB could represent any other color space transform as well. By way of example, in the case of 709, YCC2RGB would be $$[E_R[1.0\ 0.0\ 1.574[YE_G{=}1.0{-}0.187{-}0.468*Cb\ E_B]1.0\ 1.855\ 0.0]Cr]$$

where $E_R$, $E_G$ and $E_B$ are the three components of signal S2 and Y, $C_B$ and $C_R$ are the three components of Signal S1.

Signal S2 is input to block 304 where the opto-electrical transfer function of signal S2 is linearized (i.e., Degamma) to produce Signal S3. That is, the non-linear opto-electrical transfer function (i.e., the Gamma) of signal S2 is removed. The resulting signal S3 is the linearized color signal for Red, Green and Blue.

If Signal S1 was originally a YCbCr signal according to the standard ITU-R BT.709, then the Degamma function is specified as:

$$S3{=}((S2{+}0.099)/1.099)^\wedge(1/0.45)\ \text{for}\ 1{>}S2{>}0.081$$

$$S3{=}S2/4.5\ \text{for}\ 0.081{>}{=}S2{>}{=}0$$

In case S1 was a YCbCr signal according to IEC 61966-2-3 (xvYCC), then $$S3{=}((S2{+}0.099)/1.099)^\wedge(1/0.45)\ \text{for}\ S2{>}0.081$$

$$S3{=}S2/4.5\ \text{for}\ 0.081{>}{=}S2{>}{=}{-}0.081$$

$$S3{=}{-}((S2{-}0.099)/{-}1.099)^\wedge(1/0.45)\ \text{for}\ {-}0.081{>}S2$$

The S3 signal is input to process block 306 for conversion to the XYZ device independent color space, where the XYZ color space is derived from the CIE 1931 color matching functions, and is calculated by a 3×3 matrix RGB2XYZ709. In case the Red-Green- Blue signal S3 make use of the colorimetry as defined in ITU-R BT709 or IEC 61966-2-3, the RGB2XYZ709 conversion matrix is:

$$[X[0.412\ 0.357\ 0.180\ [L_R Y{=}0.212\ 0.715\ 0.072*L_G Z]\ 0.019\ 0.119\ 0.950]L_B]]$$

As will be apparent to those of skill in the art, this conversion from signal S1 to signal S4 is a conversion from a device dependent color space to a device independent color space.

Once the device independent color space signal S4 has been generated, a color transform is performed. At process block 308, an arbitrary output color is assigned to an input color, as specified in LUT3D. The color transform performed by process block 308 is done in the device independent color space, or one if its derivates, such as, for example 1976 CIE L*a*b or CIECAM02, in which case one more subsequent color space conversion may be necessary. The LUT3D may be implemented using a 3D Look Up Table, however other technologies such as a combination of ID Look up Tables and matrix operations, or inline functions, could be used as well without departing from the spirit of the present principles.

The color transform is defined in a separate step, such as a mapping from a source color gamut to a display gamut. Several approaches are known for such a transform. Once example of such is described in the publication "*Gamut Mapping based on Color Space Division for Enhancement of Lightness Contrast and Chrominance*" by Yang-Ho Cho, Yun-Tae Kim and Yeong-Ho Ha, Journal of Imaging Science and Technology 48: 66-74 (2004). The output of the block will be still in the same independent color space.

The final process step 310 is the color space conversion from the device independent color space into the device dependent color space. This is performed by applying the inverse of the target or display device gamut, RGB2XYZ_Disp, to the color transformed signal S5 to provide the S6 signal for the display color space. The RGB2XYZ_Disp gamut information (of the display device) is fed directly into process block 310 and inverted before applying the 3DLUT represented by the signal S5.

Figure 4:
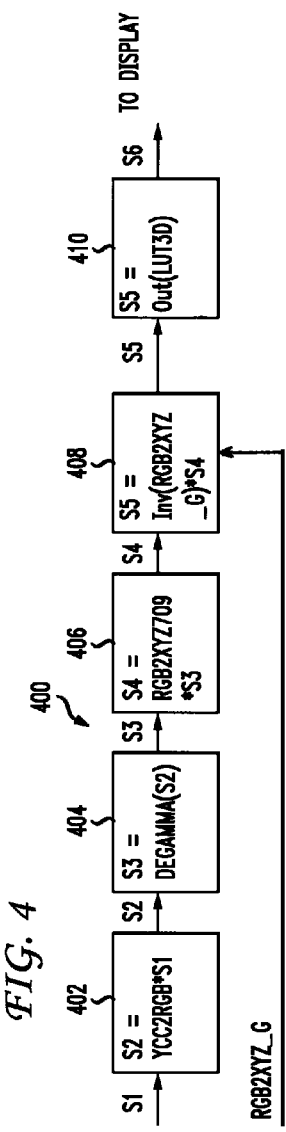
FIG. 4 depicts a block schematic diagram of an apparatus in accordance with a second aspect of the present principles for deriving display data from a color space xvYCC or other color space with source gamut metadata for a simplified table (LUT) implementations.

The embodiment of FIG. 4 constitutes a slight modification to that described with respect to FIG. 3. In particular, the color space conversion 408 and the assignment of output colors to input colors (410) have been transposed. In this manner, the XYZ device independent color space signal S4 is converted to the device dependent color space signal S5 using the inverse of the source gamut (RGB2XYZ_G), and the final assignment of output colors to input colors (410) is performed on the color space converted signal S5.

Figure 5:
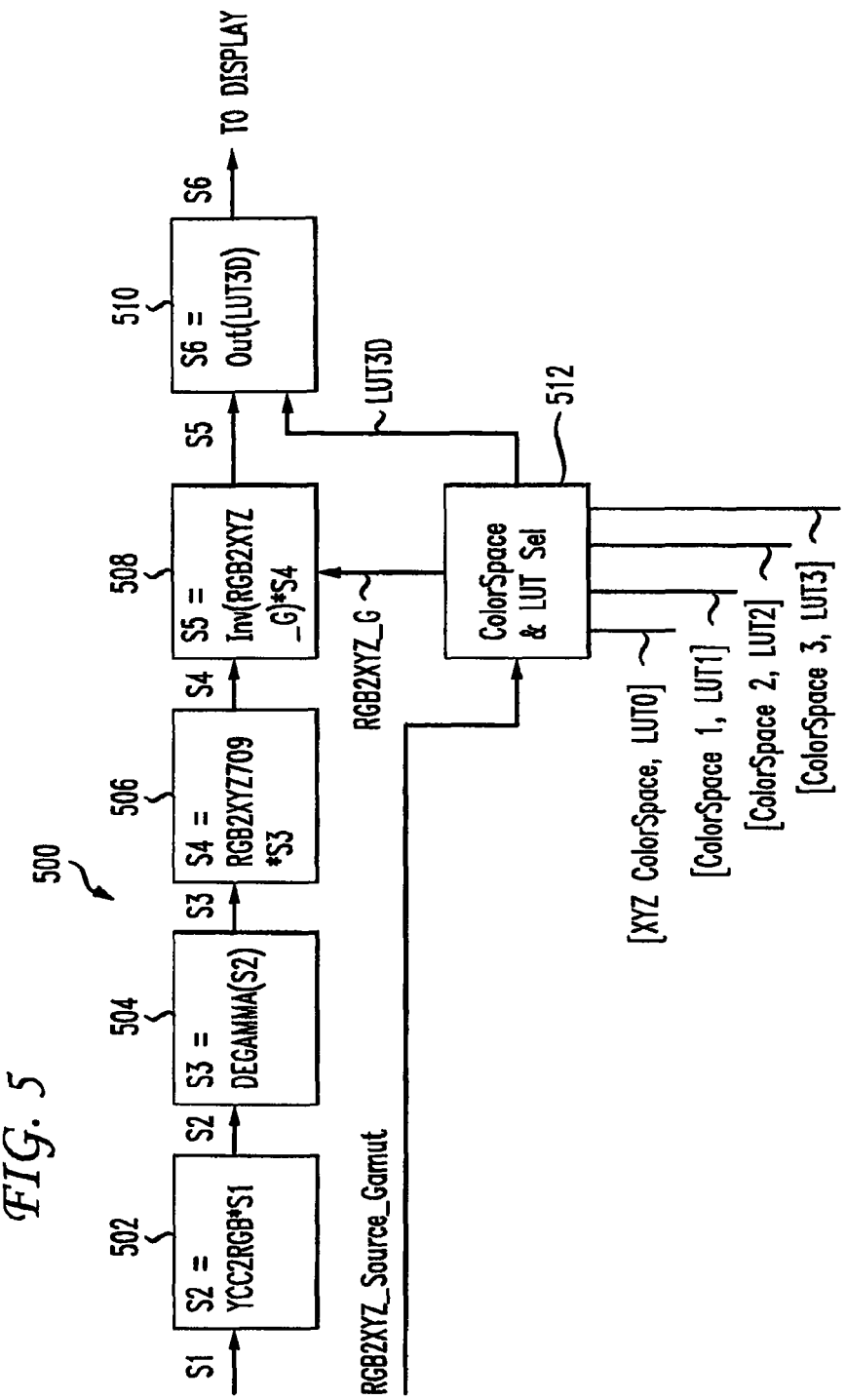
FIG. 5 describes an apparatus in accordance with another aspect of the present principles for loading a selection of pre-computed 3-dimensional LUTs selected based on the source gamut metadata.

FIG. 5 illustrates an apparatus 500 for loading pre-computed Color Transform functions or Color Look Up Tables, which could be implemented as 3D-LUTs according to an embodiment of the present principles. FIG. 5 shows a practical example of transforming a color signal with a source color gamut into a color signal with a sink color gamut, but signaling the source color gamut information (RGB2XYZ_Source-_ Gamut) to the sink (display device), by having several predefined color transformations (LUT0, LUT1, LUT2, LUT3) available at the sink, which are suitable for predefined color gamut definitions (XYZ Colorspace, Colorspace1, Colorspace2, Colorspace3), which do not necessarily have to be equal to the source color gamut (RGB2XYZ_Source_Gamut). In the implementations shown in FIGS. 4 and 5, it is integral that the transmitted signal includes both the picture signal either in compressed or uncompressed format and the metadata signaling the source color gamut (e.g., RGB2XYZ_G in FIG. 4, and RGB2XYZ_Source_Gamut in FIG. 5).

In addition, the color transform operates in a color space that is equal to or slightly bigger than the source color space. Therefore, the color transform does not contain color samples that are never to be addressed. These color samples are samples that are addressable by the input color space in use but are outside of the color gamut that is actually used and signaled by the signal RGB2XYZ_Source_Gamut. This implementation, therefore, is very color look up table friendly because it consumes less bits per sample and less nodes (in case of a LUT that uses interpolation).

Blocks 502, 504, 506, 508 and 510 depicted in FIG. 5 have the same structure and function as the respective blocks 402, 404, 406, 408 and 410 of the apparatus of FIG. 4. As such, the description of the same will not be repeated. In the embodiment of FIG. 5, several color spaces and corresponding CLUTs are stored for loading into a processing block when needed. In the present example, a color space and LUT selector 512 has several color spaces (e.g., XYZ, Colorspace1, Colorspace2, Colorspace3, etc.) and corresponding CLUTs loaded into the same. The selector 512 receives the source (or input) gamut information, RGB2XYZ_Source_Gamut, directly from the source, and makes a decision based on that information. As mentioned above, selector 512 has several stored Color Space Definitions and several stored color transforms or color look up tables that define the color transform from the source color space to the display color space. The transform from color space 1 to color space 2 is done in a two step approach, wherein during a first step, the colors are converted from the device independent color space XYZ to a color space that is defined by the color space RGB2XYZ_G. RGB2XYZ_G is one of the color spaces that are available to block 512. As mentioned above, in this example block 512 has an XYZ Colorspace, Color space 1, Color space 2 or Color space 3. The color space RGB2XYZ is equal to one of these color spaces in this example. The color space which fits the source color space most closely to fully encompass it is selected, and the color matrix or other means for converting to the target color space (e.g., RGB2XYZ_G), plus additional means like the CLUT (e.g., LUT3D) is then loaded. The selection criterion in block 512 is that RGB2XYZ_G needs to be the smallest color space that encompasses the source color gamut defined by RGB2XYZ_Source_Gamut. An exemplary selection process could be realized by converting a set of predefined color samples (e.g., the color gamut vertices), into all the available color spaces at the same time. The a check occurs to determine whether in any of the color spaces, any gamut vertices are subject to clipping, meaning that the colors converted into the different color space result in illegal values, e.g. lower than min or larger than max.

Finally, the Color Look Up Table (CLUT) will contain the color transform, and as mentioned above, preferably works in a Red, Green, Blue color domain. This color transform performs a color gamut mapping from a source color gamut to a sink color gamut, as described for block 308.

Figure 6:
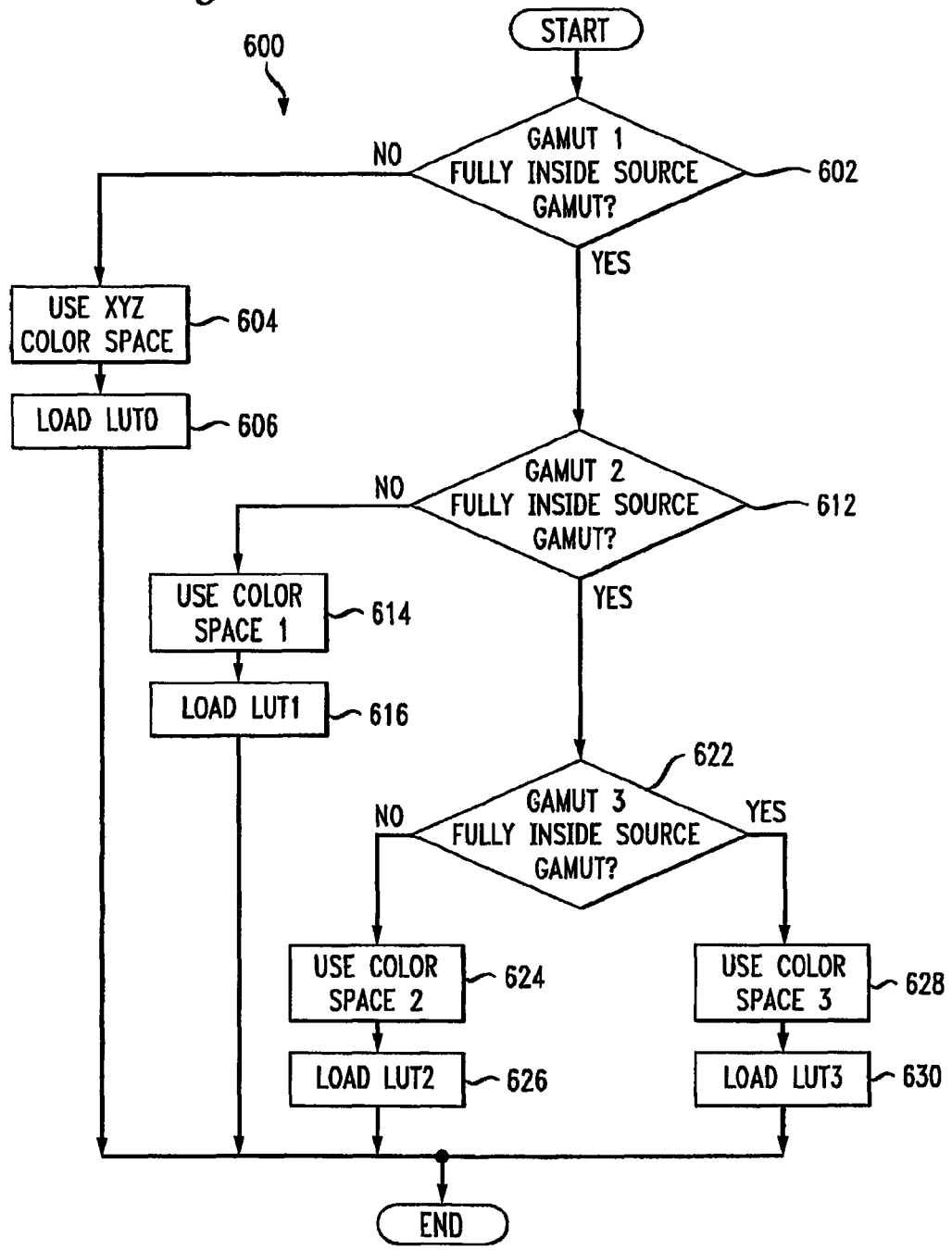
FIG. 6 depicts a method, in flow chart form, showing the steps for loading the pre-calculated information into the look up tables in according to the embodiment of FIG. 5.

FIG. 6 shows a flow diagram of the process 600 for loading pre-computed 3D-LUTs as performed by apparatus 500 of FIG. 5. Referring to FIG. 6, An initial determination 602 is made whether gamut 1 is fully inside the source gamut. When gamut 1 is not fully inside the source gamut, the XYZ color space is used during step 604 and LUT0 is loaded. When gamut 1 is fully inside the source gamut, a second determination is made during step 612 as to whether gamut 2 is fully inside the source gamut. When gamut 2 is not fully inside the source gamut, color space 1 is used during step 614 and LUT1 is loaded during step 616. When gamut 2 is fully inside the source gamut, another determination is made during step 622 as to whether gamut 3 is fully inside the source gamut. When gamut 3 is not fully inside the source gamut, color space 2 is used during step 624 and LUT2 is loaded during step 626. When gamut 3 is fully inside the source gamut, color space is used, and the corresponding LUT3 is loaded during step 630.

Figure 7A:
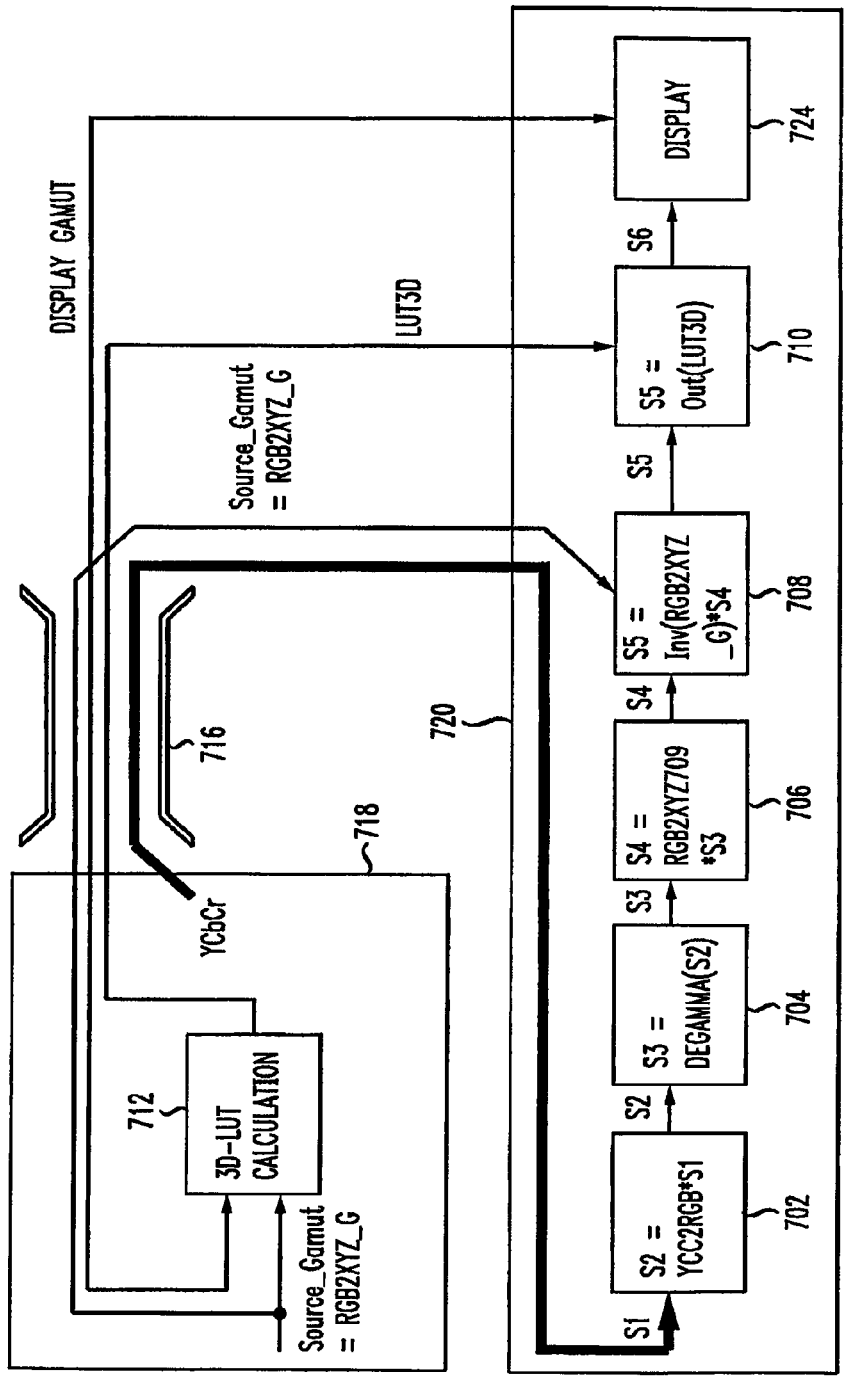
FIG. 7a depicts a block schematic diagram of an apparatus for a system for constrained color palette in a color space, according to another aspect of the present principles.

FIG. 7a, shows a system 700 that includes a signal transmitter 718, a signal delivery media 716, typically in the form of a transmission channel and a receiver 720 for the calculation of the color transform not in the display itself and for sending a video signal to the display. Examples of such receivers can include a set top box such as a cable or satellite receiver that operates as a playback unit. the receiver 720 can also comprise a device in a remote location for broadcast or peer to peer configurations. The signal YCbCr 714 is the baseband signal for transmitting over the channel 716. The channel can make use of a variety of different interfaces, such as uncompressed or compressed video interfaces like HD-SDI, HDMI, DVI, IEEE1394, and the like. However, it is contemplated herein that the channel 716, comprises a communication channel or medium, such as, for example, a broadcast cable, terrestrial over the air signal, or a satellite connection, or any combination of the same. Ideally, the channel 716 includes supports the functionality of base band signal transmission, either compressed or uncompressed, and the possibility of bi-directional transmission, which would include the preparation of the metadata, the transmission of the color data with the metadata and the implementation on the sink side (typically the display) that is needed to apply the metadata to the color data on the sink side. As will be apparent, processing steps 702, 704, 706, 708 and 710 depicted in FIG. 7a are identical to the respective steps 502, 504, 506, 508 and 510 for the embodiment of FIG. 5 and will not be repeated.

In the embodiment of FIG. 7a, a block 712 performs a 3D-LUT calculation (i.e., preparation of metadata) using the source gamut (RGB2XYZ_G). In this manner, the CLUT can accompany the signal for downloading to the processing block (not shown) of the display device. In the event of a non-standard display device, the Display_Gamut information is used to calculate the CLUT in a device other than the display device, for instance in a decoder that serves as source to the display. The Display_Gamut can be obtained by reading this information back from the display device.

In accordance with an implementation according to the present principles, the LUT calculation at block 712 uses the same method as used by block 308 in FIG. 3. The Gamut Mapping LUT calculation used in block 712 includes the following steps: 1) gathering information of the input color gamut; 2) gathering information about the output color gamut; and 3) selecting the mapping technique. In most cases, it is assumed that the input color gamut is smaller than the output color gamut. However, a mapping from a smaller color gamut to a larger color gamut may be desirable in some situations. For a 3D LUT calculations, then for example, a 3 dimensional grid of colors is defined, normally regularly spaces, so that for example it contains all colors from LUT (0,0,0)={0,0,0}({Red,Green,Blue}) to LUT(16,16,16)={1,1,1} in case of 17×17×17 3D-LUT. Then all of these 4913 values get transformed to the color space of choice for the color gamut mapping (e.g., XYZ, RGB, YCrbCr, CIEL*a*b or Jch for CIECAM02. Then the mapping technique of choice is to be applied. This mapping technique usually requires both input and output color gamut information. Finally, the calculated grid of output values is calculated back to the original color space. Those are now the values of the 3D-LUT.

Figure 7B:
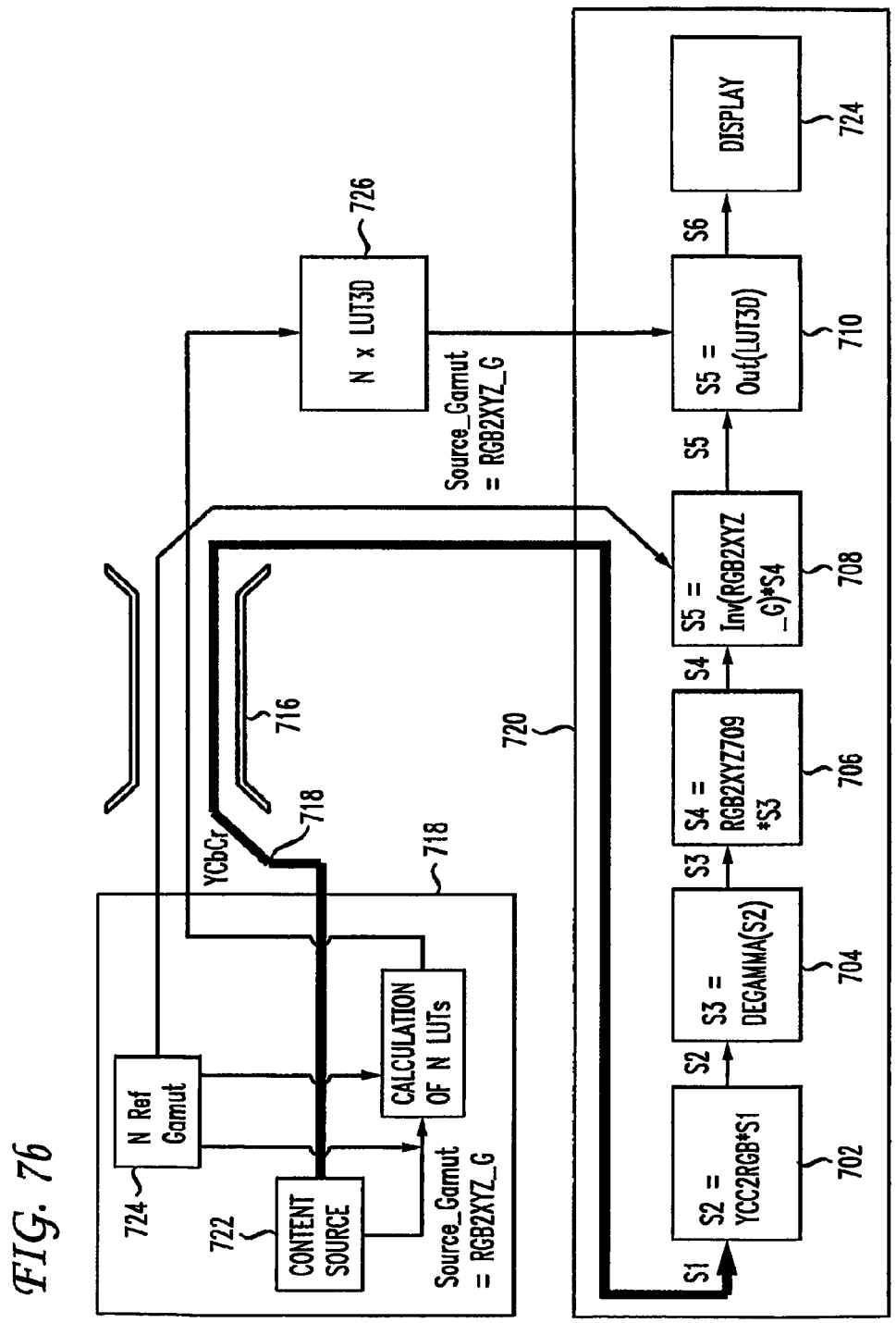
FIG. 7b depicts a block schematic diagram of an apparatus for a system for constrained color palette in a color space, according to another aspect of the present principles.

Alternatively, as shown in FIG. 7b, the source (i.e., the camera or the color correction tool, or content server), could produce CLUTs for several known reference displays. All CLUTs would then be transmitted to the display device along with the according gamut specification without the necessity of an uplink metadata channel. The display device would then select the appropriate CLUT or color transform from the set of CLUT or color transforms transmitted by block 726. The process of generating the CLUTs or color transforms is the same as that described with reference to FIG. 7a, with the exception that the process does not make use the actual color gamut of the display 724 as an input, but rather a set of possible color gamuts or N reference gamuts, (e.g., one for a typical Plasma display, one for a typical LCD display with standard CCFL, one for a typical LCD with Wide Gamut CCFL, and so forth).

In accordance with other embodiments, the CLUTs can be 3D-LUTs, however this is not required. Other more cost effective implementations can be used, for example, a 3×3 matrix and 2×3 1-D LUTs. In any event, those of skill in the art will recognize that a common format of LUT exchange between the source and the sink (display device) must be established.

Figure 8:
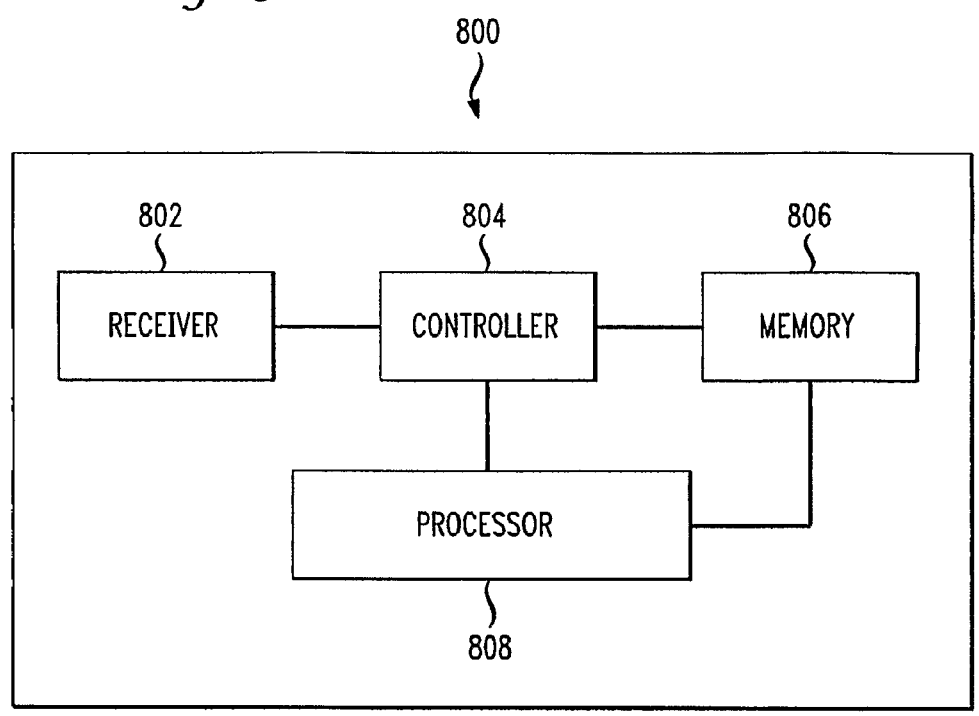
FIG. 8 is a block diagram of a decoder for implementing the system for constrained color palette in a color space, according to an aspect of the present principles.

FIG. 8 shows an exemplary embodiment of a decoder 800 according to an aspect of the present principles. The decoder includes a receiver 802 adapted to receive the color data from a source. A controller 804 converts the received color data into device-independent color space information required for the processing according the present principles. Processor 808 handles the processing required by the decoder for appropriate decoding of the received information. Processor 808 further operates to correlate the device independent color space information with the received color information such that the controller 804 can convert the device independent color space information into a device dependent color space information corresponding to the target display device.

A memory 806 connects to the controller 804 and the processor 808 and can comprise a RAM, ROM., Flash memory, a hard drive, removable media disc or any other suitable memory storage device. Memory 806 stores the LUT or any predetermined color space information relating to source and/or target display device(s). Those of ordinary skill in the art will recognize that memory 808 can be implemented in many different forms without departing from the sprit of the present principles.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

The invention claimed is:

1. A method for display of a color image, comprising:
   (a) receiving color information for a source color space and source color gamut information;
   (b) converting received color information from the source color space into color information for a device independent color space;
   (c) converting the color information from the device independent color space into color information in a device dependent color space using an inverse of the source color gamut;
   (d) processing the color information from the device dependent color space to a color space of a display device in accordance with the received color information; and
   (e) displaying the color image on the display device based on the processed color information.

2. The method of claim 1, wherein said converting (b) further comprises:
   converting component signals of the source color space to RGB signals.

3. The method of claim 2, wherein said converting (b) further comprises:
   linearizing an opto-electrical transfer function for the RGB signals.

4. The method of claim 1, wherein said processing (d) further comprises assigning output colors to each input color using the device dependent color space.

5. The method of claim 4, wherein said assigning further comprises applying a color look up table corresponding to the display device color space.

6. The method of claim 4, wherein said assigning further comprises mapping colors from the source color space to the display device color space.

7. The method of claim 1, wherein said device dependent color space has a gamut at least as large as a gamut of the source color space.

8. The method according to claim 1, further comprising:
   making available at the display device predefined color transforms suitable for predefined source color gamut definitions;
   in said converting (c), selecting a color space that is smallest among color spaces that encompass the source color gamut corresponding to said received source color gamut information; and
   in said processing (d), using the predefined color transform suitable for the selected color space.

9. The method of claim 8, wherein the predefined source color gamut definitions are different from said source color gamut corresponding to said received source color gamut information.

10. The method of claim 8, wherein said processing (d) further comprises using a color transform calculated using display gamut information and the source color gamut information.

11. The method of claim 1, wherein the source color gamut information is provided as metadata.

12. A method for display of a color image, comprising:
converting received color information from a source color space into color information for a device independent color space;
processing the color information for the device independent color space in accordance with the received color information;
pre-loading color space data; and
converting the processed color information from the device independent color space into color information for a device dependent color space for subsequent display using the pre-loaded color space data;
wherein said pre-loading further comprises:
determining whether a first gamut is fully inside a source gamut;
when the first gamut is not fully inside the source gamut, using a first device independent color space; and loading a first look up table for use in said converting the processed color information;
when said first gamut is fully inside the source gamut, determining whether a second gamut is fully inside the source gamut; and
when the second gamut is not fully inside the source gamut, using a second device independent color space; and loading a second look up table for use in said converting the processed color information.

13. The method of claim 12, wherein said preloading further comprises:
determining, when said second gamut is fully inside the source gamut, whether a third gamut is fully inside the source gamut;
using a third device independent color space when the third gamut is not fully inside the source gamut; and
loading a third look up table for use in said converting the processed color information.

14. The method of claim 12, wherein said preloading further comprises:
determining, when said second gamut is fully inside the source gamut, whether a third gamut is fully inside the source gamut;
using a fourth device independent color space when the third gamut is fully inside the source gamut; and
loading a fourth look up table for use in said converting the processed color information.

15. An apparatus for the color display of an image comprising:
a receiver configured to receive color information for a source color space and source color gamut information from a source;
a controller configured to convert the received color information from the source color space to a device independent color space and then to color information in a device dependent color space using an inverse of the source color gamut; and
a processor configured to correlate the converted device dependent color space information with the received color information.

16. The apparatus of claim 15, wherein said device dependent color space corresponds to a display device used to display the received color information.

17. The apparatus of claim 15, wherein said processor assigns output colors to each input color using the device dependent color space.

18. The apparatus of claim 17, further comprising a memory for storing at least one color look-up table (LUT), wherein said processor utilizes said at least one color LUT during said output color assignment.

19. The apparatus of claim 18, wherein said at least one color LUT is provided by the source of the source color space information.

20. The apparatus of claim 15, further comprising a memory for storing display device color space data, wherein said controller converts the device independent color space to a display device color space using said stored display device color space data.

* * * * *